United States Patent
Nishikubo et al.

(10) Patent No.: US 11,416,372 B2
(45) Date of Patent: Aug. 16, 2022

(54) STORAGE DEVICE AND METHOD OF CONTROLLING STORAGE DEVICE

(71) Applicant: Kioxia Corporation, Minato-ku (JP)

(72) Inventors: Ryuji Nishikubo, Kawasaki (JP); Hirokuni Yano, Ota (JP)

(73) Assignee: Kioxia Corporation, Minato-ku (JP)

( * ) Notice: Subject to any disclaimer, the term of this patent is extended or adjusted under 35 U.S.C. 154(b) by 145 days.

(21) Appl. No.: 16/996,984

(22) Filed: Aug. 19, 2020

(65) Prior Publication Data

US 2021/0294526 A1   Sep. 23, 2021

(30) Foreign Application Priority Data

Mar. 23, 2020   (JP) .............................. JP2020-051205

(51) Int. Cl.
*G06F 11/34* (2006.01)
*G06F 7/58* (2006.01)

(52) U.S. Cl.
CPC .......... *G06F 11/3476* (2013.01); *G06F 7/588* (2013.01)

(58) Field of Classification Search
CPC ................................................... G06F 11/3476
USPC ......................................................... 714/20, 45
See application file for complete search history.

(56) References Cited

U.S. PATENT DOCUMENTS

| | | | |
|---|---|---|---|
| 9,910,757 B2 | 3/2018 | Yamada | |
| 9,952,967 B2 | 4/2018 | Morio | |
| 2013/0119130 A1* | 5/2013 | Braams | G06F 21/552 |
| | | | 235/382 |
| 2017/0188250 A1* | 6/2017 | Stevens | H04W 24/08 |
| 2019/0310917 A1 | 10/2019 | Nishikubo et al. | |

FOREIGN PATENT DOCUMENTS

| | | | |
|---|---|---|---|
| CN | 112632639 A * | 4/2021 | |
| JP | 2006-128447 A | 5/2006 | |
| JP | 2007-199845 A | 8/2007 | |
| JP | 2010-066801 A | 3/2010 | |
| JP | 6447167 B2 | 1/2019 | |
| JP | 2019-185350 A | 10/2019 | |
| WO | WO-2013016013 A1 * | 1/2013 | .......... G06F 11/0727 |

* cited by examiner

*Primary Examiner* — Chae M Ko
(74) *Attorney, Agent, or Firm* — Oblon, McClelland, Maier & Neustadt, L.L.P.

(57) ABSTRACT

A storage device includes a hardware random number generator configured to generate a random number; a first memory; and a controller configured to control the hardware random number generator and the first memory. The controller is configured to: obtain the random number generated by the hardware random number generator after the storage device is powered up; obtain a first trace log of the storage device; and store, into the first memory, a log resulting from appending the obtained random number to the first trace log, as a second trace log.

20 Claims, 5 Drawing Sheets

FIG.3

BLK1

| Rand=1234, PoR=100 ... |
| Rand=1234, PoR=100 ... |
| Rand=5678, PoR=0 ... |
| Rand=5678, PoR=0 ... |
| Rand=5678, PoR=0 ... |
| Rand=5678, PoR=101 ... |

LOG1, LOG2, LOG3

BLK2

| Rand=1234, PoR=100 ... |
| Rand=5678, PoR=0 ... |
| Rand=5678, PoR=0 ... |
| Rand=5678, PoR=101 ... |
| Rand=5678, PoR=101 ... |
| Rand=5678, PoR=101 ... |

BLK3

| Rand=1234, PoR=100 ... |
| Rand=1234, PoR=100 ... |
| Rand=5678, PoR=0 ... |
| Rand=5678, PoR=0 ... |
| Rand=5678, PoR=101 ... |
| Rand=5678, PoR=101 ... |

FIG.5

BLK1
- Rand= ; PoR=100; ...
- Rand= ; PoR=100; ...
- Rand=5678; PoR= ; ...
- Rand=5678; PoR= ; ...
- Rand=5678; PoR= ; ...
- Rand= ; PoR=101; ...

LOG1, LOG2, LOG3

BLK2
- Rand= ; PoR=100; ...
- Rand=5678; PoR= ; ...
- Rand=5678; PoR= ; ...
- Rand= ; PoR=101; ...
- Rand= ; PoR=101; ...
- Rand= ; PoR=101; ...

BLK3
- Rand= ; PoR=100; ...
- Rand= ; PoR=100; ...
- Rand=5678; PoR= ; ...
- Rand=5678; PoR= ; ...
- Rand= ; PoR=101; ...
- Rand= ; PoR=101; ...

STORAGE DEVICE AND METHOD OF CONTROLLING STORAGE DEVICE

CROSS REFERENCE TO RELATED APPLICATION

This application is based upon and claims the benefit of priority from Japanese Patent Application No. 2020-051205, filed on Mar. 23, 2020; the entire contents of which are incorporated herein by reference.

FIELD

Embodiments of the present invention relate to a storage device and a method of controlling a storage device.

BACKGROUND

As a storage device, a memory system using a NAND flash memory is known, for instance.

BRIEF DESCRIPTION OF THE DRAWINGS

FIG. 3 is an explanatory schematic chart of a storage example of trace logs in the first embodiment.

FIG. 5 is an explanatory schematic chart of a storage example of trace logs in the second embodiment.

DETAILED DESCRIPTION

Figure 1:
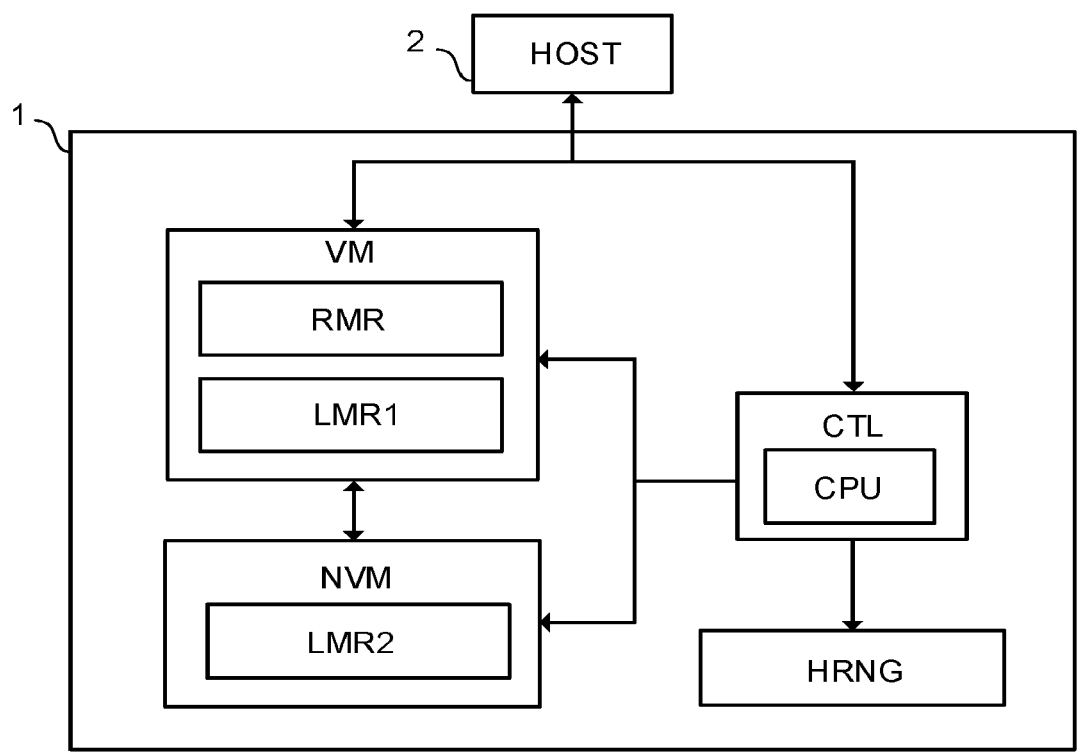
FIG. 1 is a block diagram illustrating a configuration example of an information processing system including a storage device of a first embodiment.

Embodiments make it possible to easily decide the order of a plurality of trace logs. A storage device of an embodiment includes: a hardware random number generator configured to generate a random number; a first memory; and a controller configured to control the hardware random number generator and the first memory. The controller is configured to: obtain the random number generated by the hardware random number generator after the storage device is powered up; obtain a first trace log of the storage device; and stores, into the first memory, a log resulting from appending the obtained random number to the first trace log, as a second trace log.

Embodiments will be hereinafter described with reference to the drawings. In the drawings, the relation between the thickness and planar dimension of each constituent element, a thickness ratio among the constituent elements, and so on may be different from actual ones. Further, in the embodiments, substantially the same constituent elements are denoted by the same reference signs and a description thereof will be omitted when appropriate.

First Embodiment (Configuration Example of Storage Device)

FIG. 1 is a block diagram illustrating a configuration example of an information processing system including a storage device 1 of a first embodiment. The information processing system includes the storage device 1 and a host 2. The storage device 1 is, for example, a memory system using a NAND flash memory. The storage device 1 is connected to the host 2 through a predetermined communication interface. The host 2 is an external information processing device of the storage device 1. The host 2 is a device such as a personal computer, a portable information terminal, or a server, for instance.

The storage device 1 includes a hardware random number generator HRNG, a volatile memory VM, a nonvolatile memory NVM, and a controller CTL.

The hardware random number generator HRNG is a hardware device which generates a random number without being controlled by firmware or the like. The random number generated by the hardware random number generator HRNG is a genuine random number (hardware random number) that is not a pseudo random number. The hardware random number generator HRNG generates a different random number every time, for instance, the storage device 1 is powered up.

The volatile memory VM is, for example, a dynamic random access memory (DRAM) or a static random access memory (SRAM). The volatile memory VM has a random number memory region RMR and a log memory region LMR1. For example, the random number memory region RMR and the log memory region LMR1 each include a plurality of blocks, and the blocks are each assigned to a physical address.

The random number memory region RMR is capable of storing random numbers generated by the hardware random number generator HRNG. The log memory region LMR1 is capable of storing processed trace logs (resulting logs or resulting trace logs). The trace log is log data for failure analysis of the storage device 1, and the resulting trace log is a trace log appended with the random number. The trace log is formed of, for example, binary data. The trace log includes a data field indicating error contents. Examples of the error contents include a program error, an erase error, and a read error.

The resulting trace log includes a data field indicating, for example, the number of power cycles. The number of power cycles is numerical information that increases in value every time the storage device 1 is powered up. The storage device 1 of the embodiment performs a count operation of increasing the value of the number of power cycles every time the storage device 1 is powered up from a stop state. A data field where the random number is appended may be the same as or different from the data field indicating the number of power cycles. If it is the same as the data field indicating the number of power cycles, a value of the most significant bit of the trace log is preferably set to 1 to clearly show that it indicates the random number.

In the storage device 1, the number of power cycles may be stored in the volatile memory VM or the nonvolatile memory NVM, and the number of power cycles that is restored by being read from the aforesaid memory may be appended to the trace log. The resulting trace log may further include a data field indicating a timestamp. The timestamp includes information on, for example, the occurrence time of an event and the contents of the event.

The nonvolatile memory NVM is, for example, a NAND flash memory or a NOR flash memory. The nonvolatile memory NVM has a log memory region LMR2. The log memory region LMR2 stores trace logs.

The controller CTL is, for example, a memory controller. The controller CTL includes, for example, a central processing unit (CPU). The controller CTL may include a plurality of CPUs.

The CPU controls the hardware random number generator HRNG, the volatile memory VM, and the nonvolatile memory NVM according to, for example, a firmware program or an access command from the host 2. For example, the firmware program is stored in the nonvolatile memory NVM in advance and is read out at the power-up time to be executed by the CPU. Examples of the access command include a read command, a write command, and a flush command. The flush command is a command that forcibly causes the nonvolatile memory NVM to complete a delayed data write. The access commands each include a logical address indicating an access destination. The logical address indicates a position in a logical address space that the storage device 1 provides to the host 2.

The storage device 1 accepts, for example, data to be written together with a write command from the host 2. The controller CTL of the storage device 1 decides a write area of the data from free areas of the nonvolatile memory NVM and specifies its physical address. The free area is an area having no valid data stored therein and is an area capable of storing new data. The CPU maps the physical address of the decided write area to a logical address indicating the position of the data.

(Example of Method of Controlling Storage Device)

Figure 2:
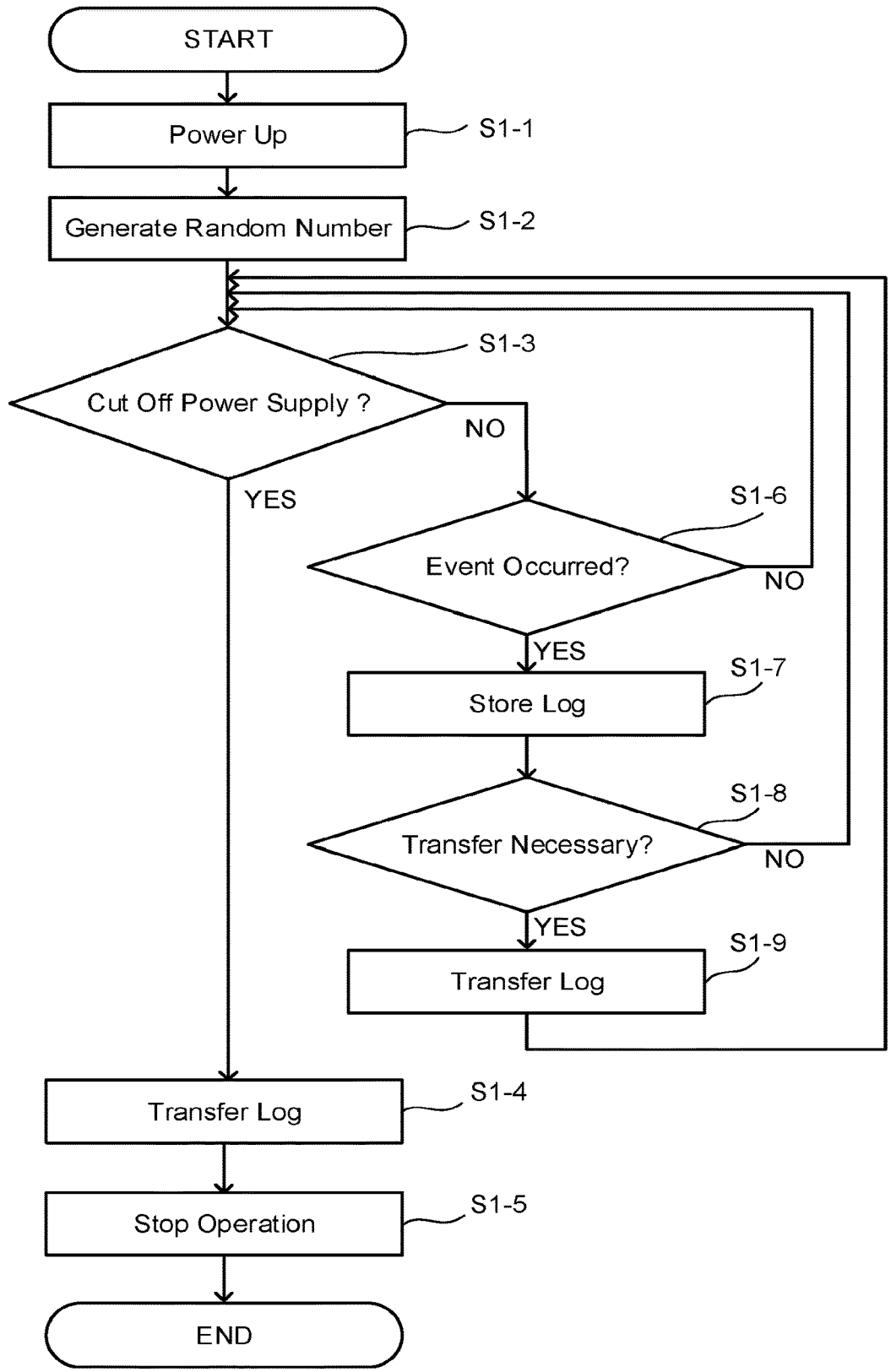
FIG. 2 is an explanatory flowchart of an example of a method of controlling the storage device of the first embodiment.

FIG. 2 is an explanatory flowchart of an example of a method of controlling the storage device 1 of the first embodiment.

For example, when supplied with a power supply voltage (START), the storage device 1 starts up (S1-1). The power supply voltage may be supplied to the storage device 1 from, for example, the host 2.

After the power-up of the storage device 1, the controller CTL controls the hardware random number generator HRNG to make it generate a random number (hardware random number) (S1-2). The controller CTL controls the volatile memory VM to store data of the generated random number into the random number memory region RMR.

After the generation of the random number, the controller CTL determines whether or not the power supply voltage to the storage device 1 is to be cut off according to, for example, a command from the host 2 (S1-3).

If the power supply voltage is to be cut off (YES at S1-3), the controller CTL controls the volatile memory VM and the nonvolatile memory NVM to store the resulting trace log stored in the log memory region LMR1 of the volatile memory VM, into the log memory region LMR2 of the nonvolatile memory NVM (S1-4). That is, the resulting trace log stored in the log memory region LMR1 is transferred to the log memory region LMR2.

After the transfer of the resulting trace log, the storage device 1 stops its operation (S1-5), and the series of operations is finished (END). The storage device 1 stops by, for example, being cut off from the power supply voltage from the host 2. Even after the storage device 1 stops, the aforesaid resulting trace log is kept stored in the nonvolatile memory NVM.

If the power supply voltage is not to be cut off (NO at S1-3), the controller CTL further determines whether or not an event has occurred (S1-6).

If an event has occurred (YES at S1-6), the controller CTL obtains a trace log corresponding to the event that has occurred and appends the number of power-up times (the number of power cycles) of the storage device 1 and the random number to this trace log. That is, the trace log corresponding to the event that has occurred becomes the resulting trace log by being appended with the number of the power-up times and the random number.

The controller CTL controls the volatile memory VM to store the resulting trace log into the log memory region LMR1 (S1-7). The resulting trace log is stored in the log memory region LMR1, for example, before the number of power cycles is restored. Incidentally, the number of power cycles may be restored together with the timestamp.

After the trace log is stored, the controller CTL determines whether or not the aforesaid resulting trace log needs to be transferred from the volatile memory VM to the nonvolatile memory NVM (S1-8). Whether or not the transfer of the aforesaid resulting trace log is necessary is decided based on, for example, the number of the aforesaid resulting trace logs stored in the volatile memory VM and other conditions.

If the transfer of the trace log is necessary (YES at S1-8), the controller CTL controls the volatile memory VM and the nonvolatile memory NVM to store the aforesaid resulting trace log stored in the log memory region LMR1 of the volatile memory VM, into the log memory region LMR2 of the nonvolatile memory NVM (S1-9). After the transfer of the aforesaid trace log, the operation of the storage device 1 returns again to the determination on whether or not the power supply voltage is to be cut off (S1-3).

If the transfer of the trace log is not necessary (NO at S1-8), the operation of the storage device 1 returns again to the determination on whether or not the power supply voltage is to be cut off (S1-3).

If an event has not occurred (NO at S1-6), the operation of the storage device 1 returns again to the determination on whether or not the power supply voltage is to be cut off (S1-3).

FIG. 3 is a schematic chart illustrating an example of a plurality of trace logs stored in the nonvolatile memory NVM. FIG. 3 schematically illustrates the log memory region LMR2 of the nonvolatile memory NVM. If the controller CTL has three CPUs, namely, CPU0, CPU1, and CPU2, the log memory region LMR2 has, for example, a first block BLK1, a second block BLK2, and a third block BLK3. The first block BLK1 has a plurality of CPU0-based trace logs. The second block BLK2 has a plurality of CPU1-based trace logs. The third block BLK3 has a plurality of CPU2-based trace logs. In this example, since the trace logs of the different CPUs are stored in the different blocks, it is necessary to decide the order of the trace logs. It should be noted that the number of the blocks BLK is not limited to the number illustrated in FIG. 3.

The blocks BLK1, BLK2, BLK3 each have at least one first trace log LOG1, at least one second trace log LOG2, and at least one third trace log LOG3, respectively. The numbers of the respective trace logs are not limited to the numbers illustrated in FIG. 3.

The first trace logs LOG1 are each a trace log before the storage device 1 stops its operation, for instance. FIG. 3 shows as an example that a value of the number of power cycles PoR of the first trace logs LOG1 is "100".

The third trace logs LOG3 are each a trace log after the number of power cycles is restored after the storage device 1 is powered up, for instance. FIG. 3 shows as an example that a value of the number of power cycles PoR of the third trace logs LOG3 is "101" and is different from the value of the number of power cycles PoR of the first trace logs LOG1.

The second trace logs LOG 2 are each a trace log before the number of power cycles PoR is restored and after the storage device 1 is powered up, for instance. A value of the number of power cycles PoR of the second trace logs LOG 2 should be "101", which is the same as the value of the number of power cycles PoR of the third trace logs LOG3. However, FIG. 3 shows that the value of the power cycles PoR of the second trace logs LOG 2 is "0" because the number of power cycles PoR is not restored. In this case, it is difficult to decide the order of the first trace logs LOG1, the second trace logs LOG2, and the third trace logs LOG3.

The storage device 1 of the first embodiment is capable of generating a different random number every time it is powered up and appending it to the trace log, and accordingly, is capable of appending different random numbers to the trace logs depending on the number of power cycles such that the first trace logs LOG1 and the third trace logs LOG3 include different random numbers Rand and the second trace logs LOG2 and the third trace logs LOG3 include the same random number Rand. FIG. 3 shows as an example that "1234" is appended as a random number Rand to the first trace logs LOG1 and "5678" is appended as a random number Rand to the second trace logs LOGs and the third trace logs LOG 3.

Trace logs appended with the same random number mean that they correspond to events after the same power-up operation, and therefore, if the second and third trace logs LOG2, LOG3 include the same random number Rand, the second and third trace logs LOG2, LOG3 can be regarded as including the same number of power cycles. Therefore, the order of a plurality of trace logs including the first trace logs LOG1, the second trace logs LOG2, and the third trace logs LOG3 can be easily decided in, for example, the chronological order of the events. Incidentally, if the trace logs each include a timestamp, the order of the trace logs may be decided further using the timestamps.

Second Embodiment (Configuration Example of Storage Device)

A storage device 1 of a second embodiment includes a hardware random number generator HRNG, a volatile memory VM, a nonvolatile memory NVM, and a controller CTL, similarly to the storage device 1 illustrated in FIG. 1. For a description of the constituent elements, the description of the storage device 1 illustrated in FIG. 1 is referred to when necessary.

(Example of Method of Controlling Storage Device)

Figure 4:
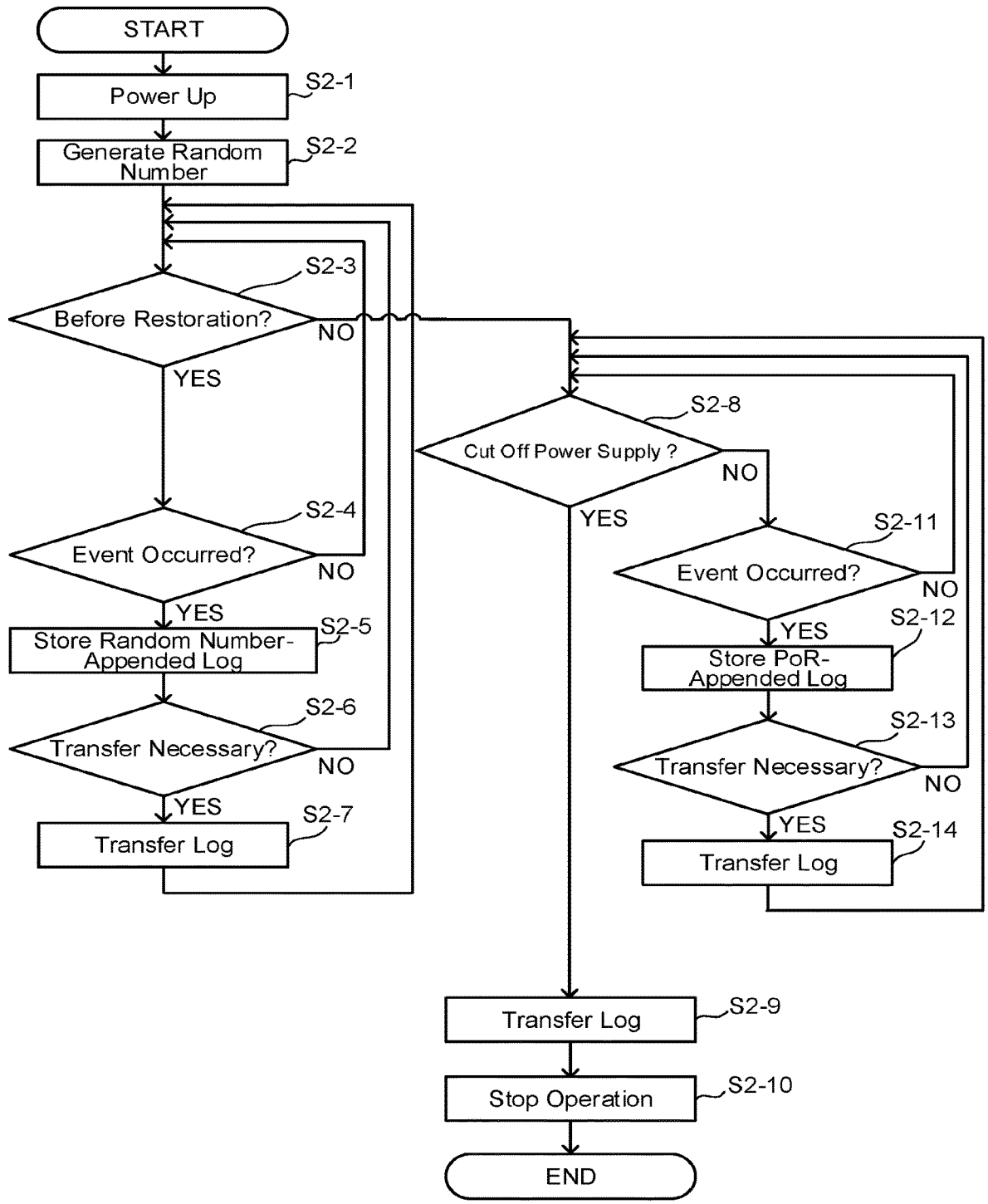
FIG. 4 is an explanatory flowchart of an example of a method of controlling a storage device of a second embodiment.

FIG. 4 is an explanatory flowchart of an example of a method of controlling the storage device 1 of the second embodiment.

For example, when supplied with a power supply voltage (START), the storage device 1 starts up (S2-1). The power supply voltage may be supplied to the storage device 1 from, for example, the host 2.

After the storage device 1 is powered up, the controller CTL controls the hardware random number generator HRNG to make it generate a random number (hardware random number) (S2-2). The controller CTL controls the volatile memory VM to store data of the generated random number into the random number memory region RMR.

After the generation of the random number, the controller CTL determines whether or not it is before the restoration of the number of power cycles (S2-3).

If it is before the restoration of the number of power cycles (YES at S2-3), the controller CTL further determines whether or not an event has occurred (S2-4).

If an event has occurred (YES at S2-4), the controller CTL obtains a trace log corresponding to the event that has occurred and appends the random number to this trace log. That is, the trace log corresponding to the event that has occurred becomes the resulting trace log by being appended with the random number. The controller CTL controls the volatile memory VM to store the resulting trace log into the log memory region LMR1 (S2-5).

After the resulting trace log is stored, the controller CTL determines whether or not the aforesaid resulting trace log needs to be transferred from the volatile memory VM to the nonvolatile memory NVM (S2-6). Whether or not the transfer of the aforesaid resulting trace log is necessary is decided based on, for example, the number of the aforesaid resulting trace logs stored in the volatile memory VM and other conditions.

If the transfer of the resulting trace log is necessary (YES at S2-6), the controller CTL controls the volatile memory VM and the nonvolatile memory NVM to store the aforesaid resulting trace log stored in the log memory region LMR1 of the volatile memory VM, into the log memory region LMR2 of the nonvolatile memory NVM (S2-7). After the transfer of the aforesaid trace log, the operation of the storage device 1 returns again to the determination on whether or not it is before the restoration of the number of power cycles (S2-3).

On the other hand, if the transfer of the resulting trace log is not necessary (NO at S2-6), the operation of the storage device 1 returns again to the determination on whether or not it is before the restoration of the number of power cycles (S2-3).

Further, if an event has not occurred (NO at S2-4), the operation of the storage device 1 returns again to the determination on whether or not it is before the restoration of the number of power cycles (S2-3).

If it is not before the restoration of the number of power cycles (NO at S2-3), the controller CTL determines whether or not the power supply voltage to the storage device 1 is to be cut off according to, for example, a command from the host 2 (S2-8).

If the power supply voltage to the storage device 1 is to be cut off (YES at S2-8), the controller CTL controls the volatile memory VM and the nonvolatile memory NVM to store the aforesaid resulting trace log stored in the log memory region LMR1 of the volatile memory VM, into the log memory region LMR2 of the nonvolatile memory NVM (S2-9). That is, the resulting trace log stored in the log memory region LMR1 is transferred to the log memory region LMR2.

After the transfer of the resulting trace log, the storage device 1 stops its operation (S2-10), and the series of operations is finished (END). The storage device 1 stops by, for example, being cut off from the power supply voltage from the host 2. Even after the storage device 1 stops, the aforesaid resulting trace log is kept stored in the nonvolatile memory NVM.

If the power supply voltage to the storage device 1 is not to be cut off (NO at S2-8), the controller CTL further determines whether or not an event has occurred (S2-11).

If an event has occurred (YES at S2-11), the controller CTL obtains a trace log corresponding to the event that has occurred and appends the number of power cycles of the storage device 1 to this trace log without appending the random number to the trace log. This is because it is not already before the restoration of the number of power cycles, that is, the number of power cycles has already been restored. The controller CTL may append the random number to the trace log together with the number of power cycles.

The controller CTL controls the volatile memory VM to store the resulting trace log into the log memory region LMR1 (S2-12).

After the trace log is stored, the controller CTL determines whether or not the aforesaid resulting trace log needs to be transferred from the volatile memory VM to the nonvolatile memory NVM (S2-13). Whether the transfer of the aforesaid resulting trace log is necessary or not is decided based on, for example, the number of the aforesaid resulting trace logs stored in the volatile memory VM and other conditions.

If the transfer of the trace log is necessary (YES at S2-13), the controller CTL controls the volatile memory VM and the nonvolatile memory NVM to store the aforesaid resulting trace log stored in the log memory region LMR1 of the volatile memory VM, into the log memory region LMR2 of the nonvolatile memory NVM (S2-14). The resulting trace log stored in the log memory region LMR1 is transferred to the log memory region LMR2. After the transfer of the aforesaid trace log, the operation of the storage device 1 returns again to the determination on whether or not the power supply voltage is to be cut off (S2-8).

If the transfer of the trace log is not necessary (NO at S2-13), the operation of the storage device 1 returns again to the determination on whether or not the power supply voltage is to be cut off (S2-8).

If an event has not occurred (NO at S2-11), the operation of the storage device 1 returns again to the determination on whether or not the power supply voltage is to be cut off (S2-8).

FIG. 5 is a schematic chart illustrating an example of a plurality of trace logs stored in the nonvolatile memory NVM. As illustrated in FIG. 5, the storage device 1 of the second embodiment generates the resulting trace logs such that first trace logs LOG1 and third trace logs LOG 3 include different numbers of power cycles PoR (in FIG. 5, the former is "100" and the latter is "101") and second trace logs LOG2 include a random number Rand ("5678" in FIG. 5) without including the number of power cycles PoR, unlike the trace logs described using FIG. 3.

For example, if the second trace logs LOG2 including the random number Rand ("5678" in FIG. 5) are present between the first and third trace logs LOG1, LOG3 including the different numbers of power cycles PoR ("100" "101" in FIG. 5), the second and third trace logs LOG2, LOG3 can be regarded as trace logs at the time of the same number of the power-up times (that is, in FIG. 5, the number of power cycles PoR in the second trace logs LOG2 is "101"). Therefore, the order of a plurality of trace logs including the first trace logs LOG1, the second trace logs LOG2, and the third trace logs LOG3 can be easily decided in, for example, the chronological order of events.

The storage device 1 of the second embodiment is further capable of appending the random number to the trace log before the restoration of the number of power cycles and is capable of appending the number of power cycles to the trace log after the restoration of the number of power cycles. Consequently, it is possible to easily decide the order of the trace logs without appending the random number after the restoration of the number of power cycles, for instance.

This embodiment can be appropriately combined with another embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a hardware random number generator configured to generate a random number;
   a first memory; and
   a memory controller configured to control the hardware random number generator and the first memory,
   wherein the memory controller is configured to:
      obtain the random number generated by the hardware random number generator after the storage device is powered up;
      obtain a first trace log of the storage device; and
      store, into the first memory, a log resulting from appending the obtained random number to the first trace log, as a second trace log.

2. The storage device according to claim 1, wherein the second trace log includes a timestamp.

3. The storage device according to claim 1, further comprising a nonvolatile second memory,
   wherein the memory controller is further configured to store, into the second memory, the second trace log stored in the first memory.

4. The storage device according to claim 3, wherein the memory controller is further configured to obtain a previous value of the number of power-up times from the first memory after the storage device is powered up.

5. The storage device according to claim 1, wherein the memory controller is further configured to store the obtained random number into the first memory.

6. The storage device according to claim 1, wherein, before a count operation of the number of power-up times of the storage device after the storage device is powered up, the memory controller is further configured to store, into the first memory, the log resulting from appending the obtained random number to the first trace log, as the second trace log.

7. The storage device according to claim 1,
   wherein the memory controller is further configured to:
      obtain a third trace log of the storage device after a count operation of the number of power-up times of the storage device after the storage device is powered up; and
      store, into the first memory, a log resulting from appending the number of power-up times of the storage device obtained after the count operation to the third trace log, as a fourth trace log.

8. The storage device according to claim 7, wherein the fourth trace log includes a timestamp.

9. The storage device according to claim 7, further comprising a nonvolatile second memory,
   wherein the memory controller is further configured to store, into the second memory, the fourth trace log stored in the first memory.

10. The storage device according to claim 7, wherein the memory controller is further configured to store, into the first memory, a log resulting from further appending the obtained random number to the third trace log, as a fifth trace log.

11. A method of controlling a storage device including a hardware random number generator and a first memory, the method comprising:
   obtaining a random number generated by the hardware random number generator after the storage device is powered up;
   obtaining a first trace log of the storage device; and storing, into the first memory, a log resulting from appending the obtained random number to the first trace log, as a second trace log.

12. The method according to claim 11, wherein the second trace log includes a timestamp.

13. The method according to claim 11, wherein the storage device further includes a nonvolatile second memory, the method further comprising
storing, into the second memory, the second trace log stored in the first memory.

14. The method according to claim 13, further comprising obtaining a previous value of the number of power-up times from the first memory after the storage device is powered up.

15. The method according to claim 11, further comprising storing the obtained random number into the first memory.

16. The method according to claim 11, wherein, before a count operation of the number of power-up times of the storage device after the storage device is powered up, the method further comprises storing, into the first memory, the log resulting from appending the obtained random number to the first trace log as the second trace log.

17. The method according to claim 11, the method comprising:
obtaining a third trace log of the storage device after a count operation of the number of power-up times of the storage device after the storage device is powered up; and
storing, into the first memory, a log resulting from appending the number of power-up times of the storage device obtained after the count operation to the third trace log, as a fourth trace log.

18. The method according to claim 17, wherein the fourth trace log includes a timestamp.

19. The method according to claim 17, wherein the storage device further includes a nonvolatile second memory, the method further comprising
storing, into the second memory, the fourth trace log stored in the first memory.

20. The method according to claim 17, the method further comprising storing, into the first memory, a log resulting from further appending the obtained random number to the third trace log, as a fifth trace log.

* * * * *